May 15, 1951  H. B. FLOWER  2,552,713
BALED HAYSTACK DUMP TRAILER
Filed Sept. 29, 1948

Herschel B. Flower Inventor
By Arthur H. Sturges, Attorney

Patented May 15, 1951

2,552,713

UNITED STATES PATENT OFFICE 2,552,713

BALED HAYSTACK DUMP TRAILER

Herschel B. Flower, Fairbury, Nebr.

Application September 29, 1948, Serial No. 51,837

1 Claim. (Cl. 298—5)

This invention relates to the harvesting of hay and more particularly it is an object of the invention to provide a dumper for dumping baled hay at the end of a field following raking and baling.

In the past it has been the practice to rake cut hay into windrows. The hay baler then scoops up the hay and passes it through the baler mechanism. Bales of hay issuing from the other end of the baling mechanism fall at random all over a hay field.

It is therefore an object of this invention to provide means for depositing stacks of hay bales at one end of the field whereby it is easier to load the bales of hay into a truck or the like.

Another object of the invention is to provide means for controlling the disposal of hay bales at will.

Still another object of the invention is to provide a baled haystack dumping mechanism particularly advantageous in the saving of time and labor.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 1:
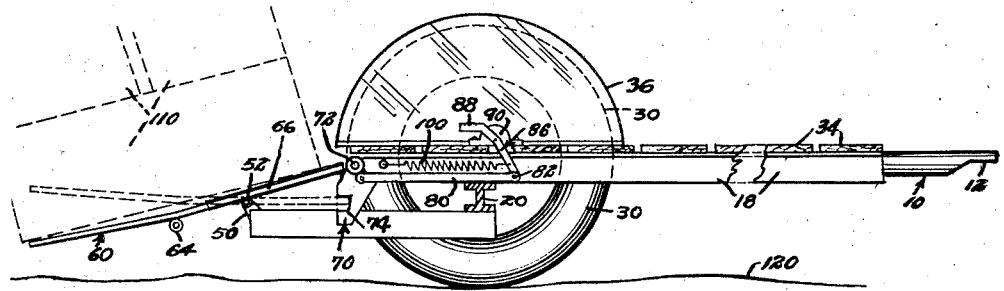
Figure 1 is a view-in-section taken along the line 1—1 of Figure 2, hay bales being shown in dotted lines on a dumping platform, the latter being shown in dotted lines in a normally horizontal supporting position, an optional tire shield being shown and portions of the tongue and floor being broken away.
Figure 2:
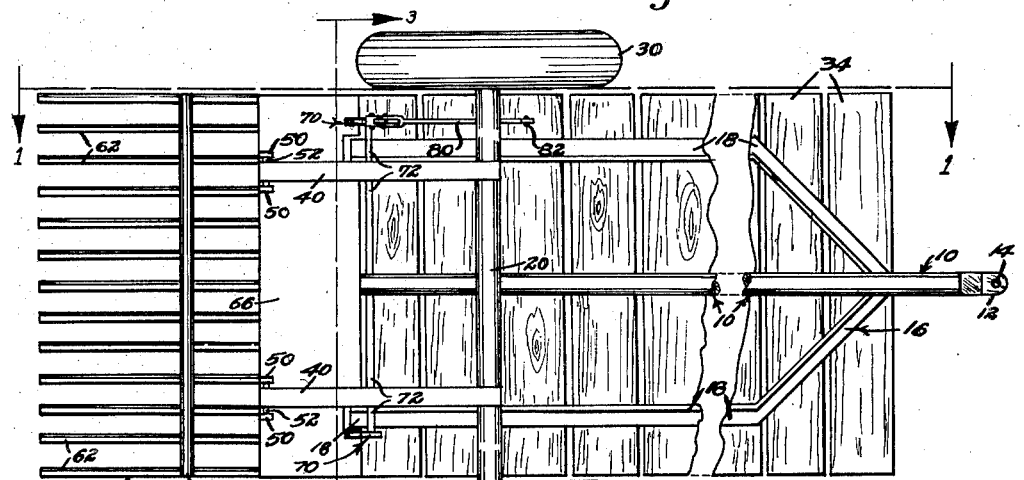
Figure 2 is a bottom plan view of the baled haystack dumping trailer of Figure 1, without tire shields; a round axle being shown in lieu of the I-beam axle of Figure 1.

The baled haystack dumper of this invention is preferably in the form of a trailer having an elongated tongue generally indicated at 10.

The tongue 10 is preferably provided with a comparatively flat portion 12 at its forward end having an aperture 14 therein providing a hitch for receiving a drop bolt.

The trailer is provided with a frame generally indicated at 16 and preferably formed of angle iron. The frame 16 includes two parallel spaced apart frame members 18 which are disposed on opposite sides of and parallel with the tongue 10.

Figure 3:
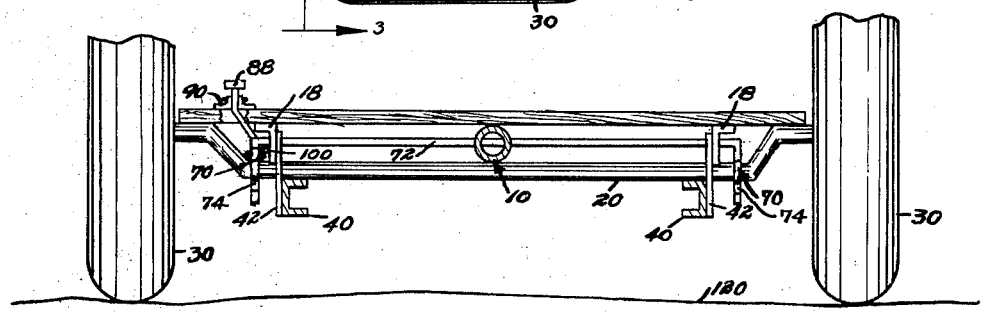
Figure 3 is a view-in-section taken along the line 3—3 of Figure 2, a portion of the floor being broken away.

An axle 20 is provided and extends transversely of the frame members 18 adjacent the rearward end thereof. The axle 20 may be in the form of an I-beam as shown in Figure 1 or in the form of a round pipe as shown in Figure 3. With either construction means are provided for pivotally mounting the wheels 30 on opposite upwardly offset ends of the shaft or axle 20.

Above the frame members 18 and between the wheels 30 a plurality of boards 34 are provided to form a trailer floor or horizontally disposed platform on which to stack baled hay.

If desired, the wheels 30 may be provided with guards 36 for the purpose of shielding the latter from hay bales being carried on the trailer. Such a guard is illustrated in Figure 1 only.

Beneath the axle 20 a pair of horizontal beams 40 are provided, the latter extending longitudinally of the trailer in parallelism with the tongue 10. The beams 40 are disposed spaced apart on opposite sides of the trailer and are secured to the frame members 18 by straps 42.

At the rearward end of the beams 40 the latter are provided with attached brackets 50 for rotatably supporting a pair of shafts 52 which latter are disposed extending transversely between the brackets 50.

The shafts 52 are secured to a dumping platform generally indicated at 60 which latter includes a plurality of tines 62 which extend in parallelism longitudinally of the trailer. The tines 62 are held in place by a cross bar 64 which extends therebeneath and secures together the tines 62. A forward end plate 66 is employed for securing the forward ends of the tines together.

Adjacent the rearward ends of the frame members 18 the latter are each provided with a hook member 70 secured thereto. The hook members 70 extend vertically downward from the frame members 18 and are pivotally secured to the latter by means of a suitable transverse shaft 72.

The hook members 70 are so constructed as to have notches 74 which open rearwardly at times when the hook or latch 70 is in a normal, or rearward, downwardly extending position.

A pull bar 80 is pivotally secured to the hook member 70 beneath the pivot shaft 72. The pull bar 80 is pivotally secured by means of a pull pin 82 at its forward end to the downwardly extending end of a foot pedal bar 86, the latter being provided with a pedal portion 88 at its upper end. The pedal bar 86 is pivotally secured to the floor boards 34 by means of a pivotal mounting bracket 90.

Resilient means such as a spring 100 is provided and is secured between the pedal bar 86 and a more rearwardly disposed portion of one of the frame members 18.

In operation, the trailer is attached to a hay baling machine. As the hay baling machine delivers hay bales rearwardly and outwardly therefrom the latter fall upon the floor boards 34. An operator on the trailer stacks the hay on the platform in a manner whereby the first row of bales is disposed in longitudinal parallelism.

Further bales are stacked transversely upon the first tier of bales in parallelism with each other. Still other tiers of bales may be stacked upon the second tier if desired. As the baler nears the end of a field the operator shoves the bale of hay rearwardly of the floor 34 and onto the tines 62 of the platform 60.

As the baler turns the corner at the end of the field the operator steps downwardly with his foot upon the foot pedal 88, pulling the rod 80 forwardly against the urge of the springs 100.

The hook members 70 then move forwardly releasing the forward edge of the plate 66 from the notches 74 of the hook members 70.

The platform 60 is thus released to freely pivot about the shafts 52 for permitting the bales of hay 110 to slide rearwardly off the platform 60. The forward motion of the trailer will then cause the stack of bales 110 to slide to the ground 120 in an upright position ready for more simple pickup.

It will be seen that this invention has provided a time and labor saving device for facilitating the delivery of stacked bales of hay from a baler to the ends of a field for more rapid pickup.

From the foregoing description, it is thought to be obvious that a baled hay stack dump constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

In a hay bale dumping trailer, the combination which comprises a horizontally disposed platform having leading and trailing ends, a transversely disposed shaft having upwardly offset ends mounted on the under surface of the platform and spaced from the trailing end thereof, wheels journaled on the ends of the shaft providing supporting means for the platform, a hitch extended from the forward end of the platform, a pair of horizontally disposed beams supported from the platform and extended from the axle to a point spaced beyond the end of the platform adjacent which the axle is positioned, a plurality of spaced horizontally disposed tines extended from a cross bar extended across and positioned upon the said beams providing a bale carrying and dumping platform, means pivotally mounting the said dumping platform on the extended ends of the said beams, depending latches having notches in the edges pivotally mounted on the trailing end of the said horizontally disposed platform and positioned whereby the said notches receive the leading end of the dumping platform for retaining the said dumping platform in the horizontally disposed position, a foot pedal pivotally mounted on the said horizontally disposed platform, means connecting the said foot pedal to the latches, and means resiliently urging the latches toward the positions of locking the said dumping platform in the horizontally disposed position, the pivotal mounting of the said dumping platform being positioned forwardly of the center thereof whereby when released from the latches the weight of hay bales thereon actuates the said platform to a dumping position.

HERSCHEL B. FLOWER.

REFERENCES CITED

The following references are of record in the file of this patent:

UNITED STATES PATENTS

| Number | Name | Date |
|---|---|---|
| 449,030 | Bennett | Mar. 24, 1891 |
| 829,301 | Storck | Aug. 21, 1906 |
| 908,633 | White | Jan. 5, 1909 |
| 1,119,475 | Tingley et al. | Dec. 1, 1914 |
| 2,008,561 | Rodgers et al. | July 16, 1935 |
| 2,234,081 | Nebuda | Mar. 4, 1941 |
| 2,327,264 | Hendrickson | Aug. 17, 1943 |